United States Patent
Kramm et al.

(10) Patent No.: US 9,581,209 B2
(45) Date of Patent: Feb. 28, 2017

(54) SPRING PACK, CLUTCH AND METHOD OF PRODUCING A CLUTCH

(71) Applicants: GETRAG Getriebe- und Zahnradfabrik Hermann Hagenmeyer GmbH & Cie KG, Untergruppenbach (DE); Valeo Embrayages, Amiens (FR)

(72) Inventors: Torsten Kramm, Ilsfeld (DE); Gerhard Bellinger, Muehlhausen (DE); Hansi Gremplini, Ingersheim (DE); Nicolas Depoilly, Dury (FR); Pascal Dekydtspotter, Puchevillers (FR); Doremus Olivier, Izel des Harmeaux (FR)

(73) Assignees: GETRAG Getriebe- und Zahnradfabrik Hermann Hagenmeyer GmbH & Cie KG, Untergruppenbach (DE); Valeo Embrayages, Amiens (FR)

( * ) Notice: Subject to any disclaimer, the term of this patent is extended or adjusted under 35 U.S.C. 154(b) by 37 days.

(21) Appl. No.: 14/630,069

(22) Filed: Feb. 24, 2015

(65) Prior Publication Data

US 2015/0240887 A1     Aug. 27, 2015

(30) Foreign Application Priority Data

Feb. 26, 2014   (DE) .................. 10 2014 102 515

(51) Int. Cl.
*F16D 25/0638*   (2006.01)
*F16D 25/12*   (2006.01)
(Continued)

(52) U.S. Cl.
CPC .......... *F16D 25/12* (2013.01); *F16D 25/0638* (2013.01); *F16F 3/04* (2013.01); *F16D 1/0858* (2013.01)

(58) Field of Classification Search
CPC ....... F16F 3/04; F16F 3/02; F16F 1/12; F16D 1/0858; F16D 25/063
See application file for complete search history.

(56) References Cited

U.S. PATENT DOCUMENTS

| | | |
|---|---|---|
| 3,596,537 A | 8/1971 | Koivunen |
| 4,690,037 A | 9/1987 | Sumiya |
| (Continued) | | |

FOREIGN PATENT DOCUMENTS

| | | |
|---|---|---|
| DE | 2025029 A1 | 12/1970 |
| DE | 1946340 A1 | 4/1971 |
| (Continued) | | |

OTHER PUBLICATIONS

European Patent Office Search Report for Application No. 15155583.6 dated Dec. 4, 2015, 5 pages.
(Continued)

*Primary Examiner* — Jacob S Scott
*Assistant Examiner* — Tinh Dang
(74) *Attorney, Agent, or Firm* — Reising Ethington P.C.

(57) ABSTRACT

Spring pack for a clutch arrangement of a motor vehicle drivetrain. The spring pack has a first ring element, has a second ring element and has a multiplicity of individual springs which are coupled to the first and the second ring elements such that the first and the second ring elements are movable relative to one another in an axial direction in a manner coupled by the springs. The first and the second ring elements each have an inner circumferential section and an outer circumferential section. At least one of the first and the second ring elements has, in the region of at least one of its inner circumferential section and its outer circumferential section, a multiplicity of radially deformable elements which are designed so as to enable the spring pack to be (Continued)

centered in relation to a ring surface or so as to enable the spring pack to be mounted captively on the ring surface.

13 Claims, 2 Drawing Sheets

(51) Int. Cl.
*F16F 3/02* (2006.01)
*B60G 11/16* (2006.01)
*F16F 3/04* (2006.01)
*F16D 1/08* (2006.01)

(56) References Cited

U.S. PATENT DOCUMENTS

| | | | | |
|---|---|---|---|---|
| 5,306,086 | A * | 4/1994 | Orlowski | F16F 3/04 |
| | | | | 192/89.26 |
| 5,772,191 | A * | 6/1998 | Nakano | F16F 1/122 |
| | | | | 267/179 |
| 7,357,381 | B2 * | 4/2008 | Wakamori | B21F 15/10 |
| | | | | 267/179 |
| 9,416,836 | B2 * | 8/2016 | Fueki | F16D 25/12 |
| 2004/0104523 | A1 | 6/2004 | Costello | |
| 2005/0207835 | A1 | 9/2005 | Schoch | |
| 2010/0320660 | A1 * | 12/2010 | Takeda | F16F 1/125 |
| | | | | 267/168 |

FOREIGN PATENT DOCUMENTS

| | | |
|---|---|---|
| DE | 19836596 A1 | 1/1999 |
| DE | 10323797 A1 | 12/2004 |
| DE | 102006044218 A1 | 4/2007 |
| DE | 102007008946 A1 | 2/2008 |
| DE | 102008042001 A1 | 3/2009 |
| DE | 102008040172 A1 | 1/2010 |
| EP | 1298355 | 4/2003 |
| GB | 2018174 | 10/1979 |
| JP | 2007127164 A | 5/2007 |

OTHER PUBLICATIONS

German Search Report, 5 pages.
Chinese Office Action for Application No. 201510088752.2 Dated Dec. 2, 2016, 9 Pages.
English Translation of Chinese Office Action for Application No. 201510088752.2 Dated Dec. 2, 2016, 7 Pages.

* cited by examiner

SPRING PACK, CLUTCH AND METHOD OF PRODUCING A CLUTCH

CROSS REFERENCES TO RELATED APPLICATIONS

This application claims the priority of German utility model application DE 102014102515.6, filed Feb. 26, 2014.

BACKGROUND OF THE INVENTION

The present invention relates to a spring pack for a clutch arrangement of a motor vehicle drivetrain, having a first ring element, having a second ring element and having a multiplicity of individual springs which are coupled to the first and the second ring element such that the first and the second ring element are movable relative to one another in an axial direction in a manner coupled by the springs, wherein the first and the second ring element each have an inner circumferential section and an outer circumferential section.

The present invention also relates to a clutch arrangement for a motor vehicle drivetrain, having a carrier element which has an axially extending ring surface on which a spring pack is mounted.

Finally, the present invention relates to a method for producing a clutch arrangement using a spring pack of said type.

In the field of clutch arrangements for motor vehicle drivetrains, it is known for use to be made of prefabricated spring packs for preloading a clutch of the clutch arrangement into a predetermined position, for example into an open position.

In particular in the case of clutch arrangements which are hydraulically actuated, it is known here for a spring pack of said type to be pushed onto a carrier element during the assembly of the clutch arrangement. The carrier element may for example be a hydraulically actuated piston of the clutch arrangement.

If the spring pack is mounted on the carrier element with a clearance fit, there is the risk of the spring pack becoming detached from the carrier element during the assembly process before further elements can be mounted. If the spring pack is mounted on the carrier element with an interference fit, this can lead to deformation of a ring element and/or of the carrier element. This can adversely affect the functioning of the spring pack during later operation.

Consequently, the manufacturing processes implemented until now are not "robust".

SUMMARY OF THE INVENTION

Against this background, it is an object of the invention to specify an improved spring pack, an improved clutch arrangement and an improved method for producing a clutch arrangement.

In the case of the spring pack mentioned in the introduction, said object is achieved in that the first and/or the second ring element has, in the region of its inner circumferential section and/or in the region of its outer circumferential section, a multiplicity of radially deformable elements so as to enable the spring pack to be centered in relation to a ring surface and/or so as to enable the spring pack to be mounted captively.

Furthermore, the above object is achieved by means of a clutch arrangement for a motor vehicle drivetrain, having a carrier element which has an axially extending ring surface on which a spring pack is mounted, wherein the spring pack is a spring pack according to the invention, and wherein the deformable elements of a ring element have deformed on the ring surface and center and/or captively hold the spring pack in relation to the carrier element.

Finally, the object is achieved by means of a method for producing a clutch arrangement, in particular a clutch arrangement according to the invention, having the steps: providing a spring pack according to the invention, and pushing the spring pack axially onto a carrier element of the clutch arrangement, wherein deformable elements of a ring element of the spring pack deform radially on the carrier element in order to center and/or captively hold the spring pack in relation to the carrier element.

With the spring pack according to the invention, owing to the deformable projections, it is possible for the production of the clutch arrangement to be simplified. Since only the projections rather than an entire ring element have to be deformed to attain an interference fit, the mounting process can be performed with a relatively small axial mounting force. It is furthermore advantageous if play-free centering on the carrier element can be realized by means of the projections. Furthermore, it is alternatively or additionally possible for the ring element or the entire spring pack to be held on the carrier element with an interference fit by means of the projections.

Consequently, deformations of the ring element during the mounting process can, altogether, be reduced or prevented. Furthermore, it is preferably possible for the spring pack to be prevented from becoming detached from the carrier element again during the assembly process before further mounting steps are carried out.

Consequently, the overall result is a robust and inexpensive production method.

The projections are preferably designed so as to have a very slight oversize in relation to the ring surface of the carrier element. The oversize/allowance may for example lie in a range from 0.01-3 mm, in particular in a range from 0.02-2 mm, in particular in a range from 0.04-1 mm.

This has the result that the pushing of the spring pack axially onto the carrier element requires a minimal force, which is preferably greater than 10 N and/or preferably less than 3 kN.

Within this range, it is advantageous that disadvantageous deformations in particular of the ring element in the region between inner circumferential section and outer circumferential section are prevented Within said region, the ring elements preferably have embossments by means of which the individual springs can be coupled to the ring elements.

Deformations in said region could consequently impair the coupling between the individual springs and the ring elements.

The individual springs are preferably each in the form of helical or spiral springs, and may in particular be in the form of compression springs, though may also be in the form of tension springs.

The number of deformable elements that are preferably arranged in uniformly distributed fashion over the inner circumferential section or the outer circumferential section is preferably in the range from 3-8, in particular in the range from 3-6, and is in particular 4.

In general, it is preferable for at least one of the ring elements to be in the form of a sheet-metal part, which may be produced for example by punching or the like. In this case, the sheet-metal parts have a relatively small axial thickness and define a radial metal sheet plane.

In this case, axial holes may be formed into the sheet-metal ring elements, which axial holes are stamped such that axially protruding embossed sections or ring embossments are formed onto which the individual springs can be pushed axially and captively fixed.

The deformability of the elements in a radial direction may be implemented in the form of elastic and/or plastic deformability. Radially elastic deformability is preferable. The projections preferably extend in each case over an angle range of the inner circumferential section and/or of the outer circumferential section of less than 25°, in particular less than 15° and particularly preferably less than 10°. The angle range is at least 1°.

The object is thus achieved in its entirety.

In a particularly preferred embodiment, the first and/or the second ring element is in the form of a sheet-metal part with a circular inner circumferential section and/or outer circumferential section, wherein the deformable elements are in the form of projections which protrude in relation to the circular inner circumferential section and/or outer circumferential section.

With this embodiment, it can be achieved that only the deformable elements, but not the ring parts themselves, are deformed when the spring pack is pushed axially onto the carrier element.

In a further preferred embodiment, the projections are oriented at an angle with respect to a radial plane of the sheet-metal part, wherein the angle is greater than 0° and less than 90°.

The angle is particularly preferably greater than 10° and less than 45°.

The specified angles apply in particular to the non-deformed state. The angle in the deformed state may be less than or greater than that in the non-deformed state.

The orientation of the angle in relation to the metal sheet plane is preferably selected such that the projections are directed toward an axial center of the spring pack. Accordingly, the spring packs can be pushed onto a carrier element relatively easily because the projections themselves exhibit a form of centering function upon the initial contact of the carrier element.

The deformable elements may be produced as separate elements and coupled to the ring element.

It is however particularly preferable for the deformable elements to be formed integrally with the ring element.

In particular in the case of a production method such as punching of the ring elements as sheet-metal parts, the deformable elements can be manufactured easily in this way.

In general, the two ring elements of the spring pack may be formed by different components.

It is however particularly preferable for the ring elements to be produced as identical parts.

In this way, the production outlay for the spring pack can be reduced.

If the projections are oriented at an angle with respect to a radial plane of a sheet-metal part, it is preferable if the projections of the two ring elements point toward one another, such that the ring elements are oriented substantially mirror-symmetrically with respect to a radial plane lying between the ring elements.

In this situation, the projections of the two ring elements may be aligned with one another in the circumferential direction, though may also be arranged offset with respect to one another in a circumferential direction.

In the case of the clutch arrangement according to the invention, it is preferable for the other ring element, that is to say that which does not have projections deformed with respect to a ring surface of the carrier element, to be mounted in radially movable fashion in the clutch arrangement.

The other ring element may be supported in the axial direction of the clutch arrangement for example directly or indirectly on a counterpart element which is fixed with respect to a housing or on a counterpart element which is connected rotationally conjointly to the carrier element. The counterpart element may for example be formed by a radial web.

In the case of a dual clutch arrangement, it is preferable for two spring packs, which are preferably of identical form, to be arranged on axially opposite sides of a radial web of said type, wherein in each case one other ring element of both spring packs is supported directly or indirectly in the axial direction on the radial web, and wherein the respective former ring element is preferably mounted on a ring surface of a carrier element in the manner according to the invention, wherein the carrier element is preferably a piston of an actuator arrangement for a respective friction clutch of the dual clutch arrangement.

The dual clutch arrangement preferably has two wet-running multiplate clutches.

The radial web is preferably fixed to a sleeve which is mounted, by means of a rotary leadthrough, on a hub which is fixed with respect to a housing. The radial web preferably also serves for the mounting or support of an input element of the dual clutch arrangement.

It is self-evident that the features mentioned above and the features yet to be explained below can be used not only in the respectively specified combination but also in other combinations or individually without departing from the scope of the present invention.

BRIEF DESCRIPTION OF THE DRAWINGS

Exemplary embodiments of the invention are represented in the drawings and are explained in more detail in the following description. In the drawings.

DESCRIPTION OF PREFERRED EMBODIMENTS

Figure 1:
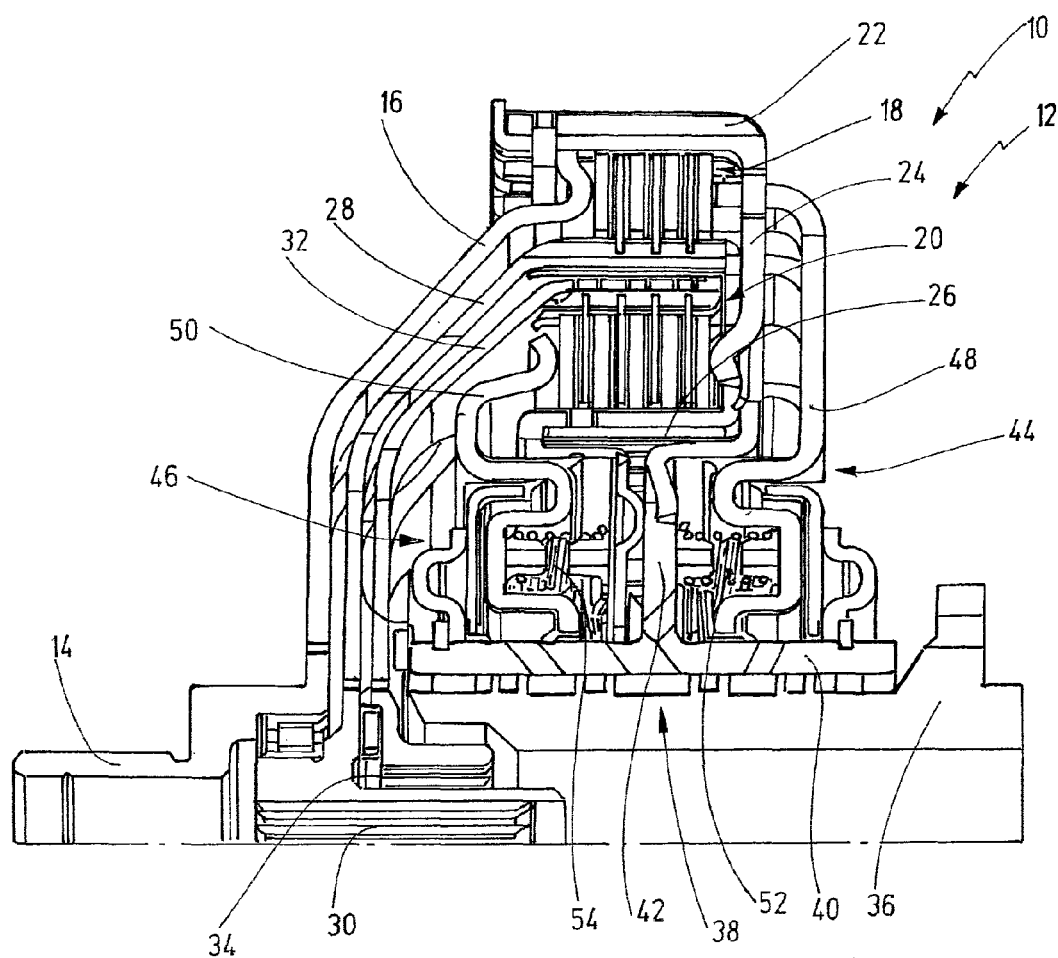
FIG. 1 shows a schematic longitudinal sectional view through a dual clutch arrangement for a dual clutch transmission, having two wet-running friction clutches and two hydraulic actuator arrangements, and two axially acting spring packs which may be designed in accordance with the invention.

A drivetrain for a motor vehicle is schematically illustrated, and designated generally by 10, in FIG. 1.

The drivetrain 10 comprises a dual clutch arrangement 12, the input shaft 14 of which can be coupled to a drive engine such as an internal combustion engine. The input shaft 14 is connected to an input element 16 in the form of a drive cage.

The dual clutch arrangement 12 has a first friction clutch 18 and a second friction clutch 20 which are arranged so as to be nested radially one inside the other. The friction clutches 18, 20 are in the form of wet-running multiplate clutches.

An outer plate carrier 22 of the first friction clutch 18 is connected to the input element 16. The outer plate carrier 22 is connected, on the side facing away from the input shaft 14, to a radial element 24, which in turn is connected to an inner plate carrier 26 of the second friction clutch 20. An inner plate carrier of the first friction clutch 18 is connected to a first output element 28, which is arranged axially adjacent to the input element 16 and which is in the form of a first drive output cage. The first output element 28 is connected to a first output shaft 30 in the form of an inner shaft, which can be connected to a first sub-transmission of the drivetrain 10.

Correspondingly, an outer plate carrier of the second friction clutch 20 is connected to a second output element 32, which is likewise in the form of a drive output cage and arranged axially adjacent to the first output element 28. The second output element 32 is connected to a second output shaft 34 which is in the form of a hollow shaft and which can be connected to a second sub-transmission of the drivetrain 10.

The dual clutch arrangement 12 furthermore comprises a hub 36 which is fixed with respect to a housing and which extends, from the axial side situated opposite the input shaft 14, in the axial direction into the friction clutches 18, 20. A sleeve 40 is rotatably mounted on the hub 36 fixed with respect to a housing. Between the sleeve 40 and the hub 36 fixed with respect to a housing, there is formed a rotary leadthrough 38 via which hydraulic fluid for the cooling and actuation of the friction clutches 18, 20 can be supplied.

To an outer circumference of the sleeve 40 there is fixed a radial web 42 which is arranged, as viewed in the axial direction, approximately centrally with respect to the friction clutches 18, 20.

The dual clutch arrangement 12 furthermore has a first actuator arrangement 44 for the actuation of the first friction clutch 18 and a second actuator arrangement 46 for the actuation of the second friction clutch 20. The first actuator arrangement 44 comprises a first piston 48. The second actuator arrangement 46 comprises a second piston 50. The pistons 48, 50 are arranged on axially opposite sides of the radial web 42 and are designed to actuate the first and second friction clutches 18, 20 respectively, wherein, proceeding from the initial positions shown in FIG. 1, the pistons 48, 50 are each moved in a direction toward one another in order to actuate the associated friction clutch 18, 20.

The first actuator arrangement 44 has a first spring pack 52. The second actuator arrangement 46 has a second spring pack 54.

The spring packs 52, 54 are arranged in axially opposite sides of the radial web 42. The spring packs 52, 54 are each supported directly or indirectly in the axial direction on the radial web 42. At their axially opposite ends, the spring packs 52, 54 are each mounted on the ring surfaces of the pistons 48 and 50 respectively.

The spring packs 52, 54 each have a first ring element 60 and a second ring element 62. Furthermore, the spring packs 52, 54 each comprise a multiplicity of individual springs 64, which are preferably in the form of compression springs. The spring packs 52, 54 consequently preload the pistons 48, 50 into a position in which the respective friction clutches 18, 20 are open.

The individual springs of the spring packs 52, 54 are in each case preferably spiral compression springs The first and/or second ring element 60, 62 has, in the region of its inner circumferential section 68 and/or in the region of its outer circumferential section 66, a multiplicity of radially deformable elements 70 which, in the mounted state that is shown, have deformed in relation to an axially extending ring surface of the respective piston. In this way, the spring packs 52, 54 are centered and/or captively held in relation to their respective pistons 48, 50.

Figure 2:
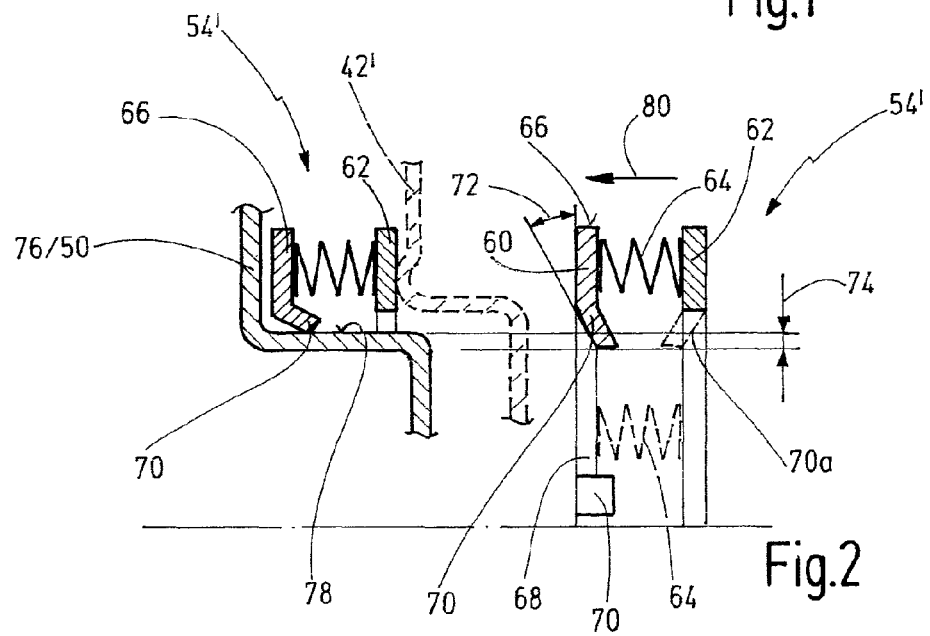
FIG. 2 shows, on the right-hand side, a schematic illustration of an embodiment of a spring pack according to the invention and, on the left-hand side, in a schematic illustration, the spring pack pushed axially onto a ring surface of a carrier element.
Figure 3:
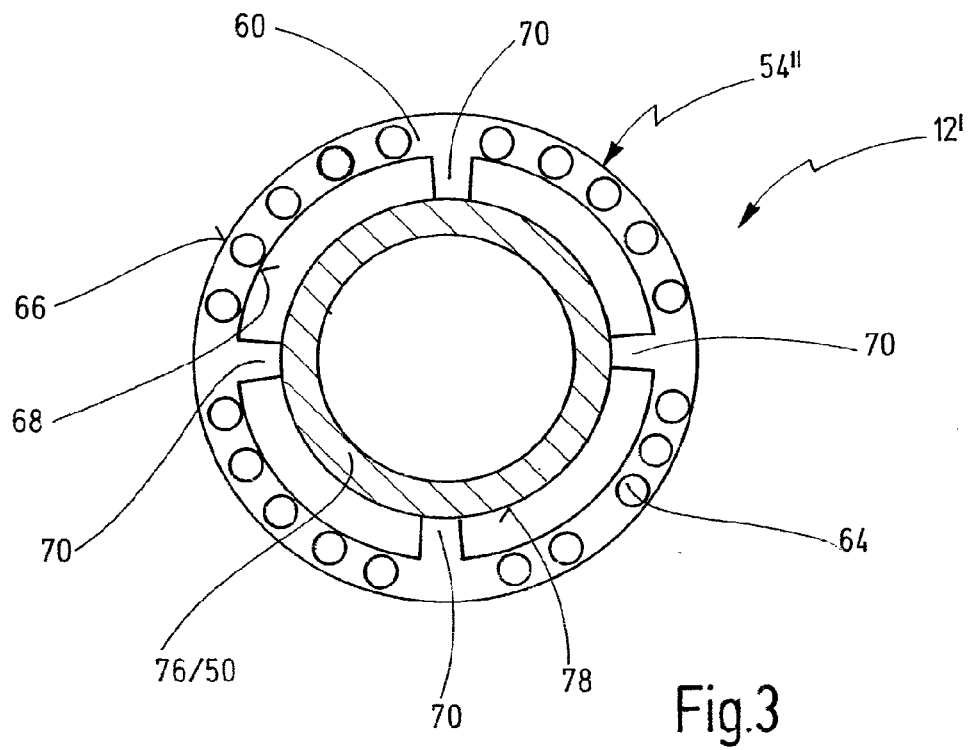
FIG. 3 shows a schematic plan view of a further embodiment of a clutch arrangement according to the invention having a spring pack according to the invention.
Figure 4:
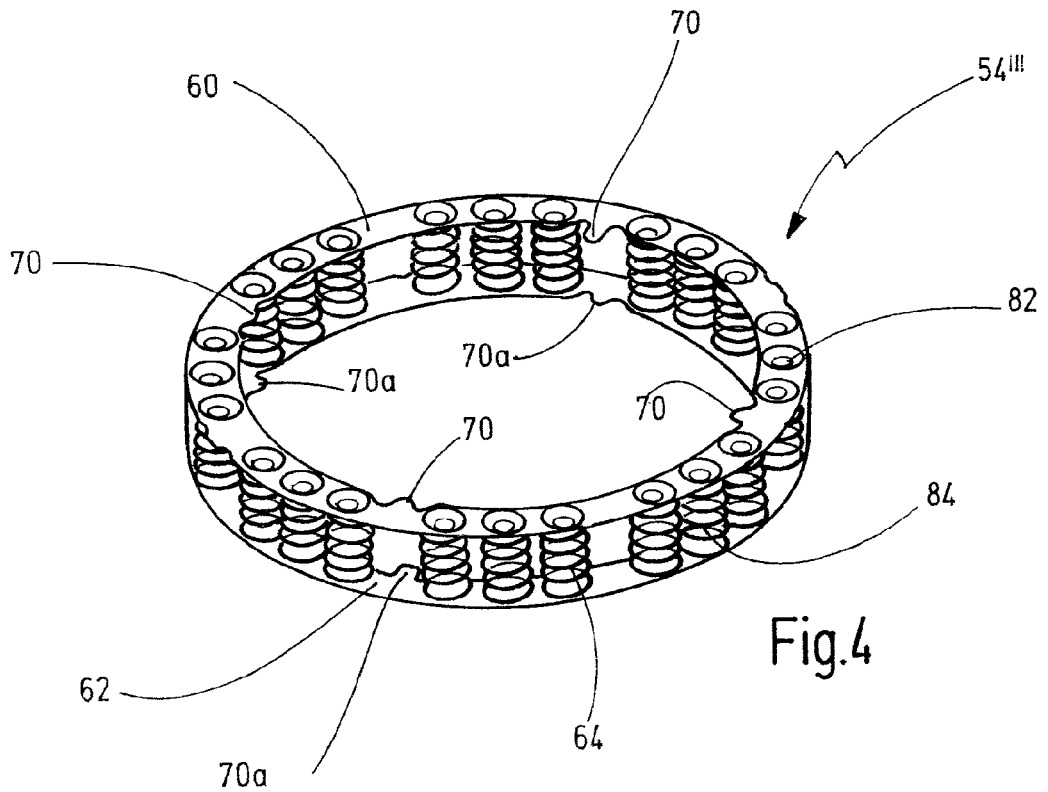
FIG. 4 shows a schematic perspective view of a further exemplary embodiment of a spring pack according to the invention.

The following FIGS. 2 to 4 illustrate preferred embodiments of spring packs of said type, wherein these are in each case shown by way of example on the basis of the spring pack 54. The spring packs 52, 54 are however preferably of identical construction, such that the first spring pack 52 can be correspondingly derived from the illustrations of the second spring pack 54.

FIG. 2 illustrates a preferred embodiment of a spring pack 54' of said type in a schematic longitudinal sectional view. The spring pack 54' has a first ring element 60 and a second ring element 62. Between the ring elements 60, 62 there is arranged a multiplicity of individual springs 64 in the form of helical compression springs. At their axial ends, the individual springs 64 are each captively coupled to the ring elements 60, 62. The ring elements 60, 62 are preferably in the form of sheet-metal parts, and are produced in particular by punching or the like.

The ring elements 60, 62 each have an outer circumferential section 66 and an inner circumferential section 68. Said circumferential sections are in each case of circular form.

In the present case, the first ring element 60 has a multiplicity of projections 70 arranged so as to be distributed over the circumference, which projections extend inward in a radial direction from the inner circumferential section 68.

The projections 70 are oriented at an angle 72 in relation to a radial plane of the first ring element 60. The angle 72 is greater than 0° and less than 90°, and may in particular lie in the range between 5° and 45°.

The projections 70 extend in a radial direction so as to define an inner diameter which is smaller than the outer diameter of a ring surface 78 of a carrier element 76. The carrier element 76 may for example be the piston 50 illustrated in FIG. 1.

The ring surface 78 is substantially in the form of an axially extending ring surface or cylinder surface, such that the spring pack 54' can be pushed in an axial direction onto the ring surface 78 as indicated in FIG. 2 by an arrow.

The spring pack 54' is shown in the mounted state on the left-hand side in FIG. 2. In this case, the projections 70 have been deformed outward in the radial direction, such that the projections 70 are fixed with respect to the carrier element 76 by way of an interference fit. The interference fit is selected such that the spring pack 54' is centered and/or captively held in relation to the carrier element 76.

Accordingly, after the mounting of the spring pack 54' on the carrier element 76, a further element can be mounted, and/or the arrangement composed of carrier element 76 and spring pack 54' can be mounted with respect to a further element, for example the radial web 42 of FIG. 1 or a corresponding element 42' schematically indicated in FIG. 2.

In said mounted state, the second ring element 62 is mounted so as to be movable in a radial direction but is supported in an axial direction on the further element 42', as illustrated on the left-hand side in FIG. 2.

In FIG. 2, it is schematically illustrated, at 70a, that the second ring element 62 may be equipped with corresponding projections 70a on its inner circumferential section.

In the illustrated mounting variant, however, said projections 70a are without function. It is however advantageous that the ring elements 60, 62 can be produced as identical parts, wherein these are arranged mirror-symmetrically with respect to one another such that their projections 70, 70a point toward one another.

Mounting and centering on the carrier element 76 is simplified owing to the projections 70 and/or the projections 70a being oriented such that they extend from an axial outer surface of the respective ring element 60, 62 toward the respective other ring element.

FIG. 3 shows a further embodiment of a drivetrain 12' with a further embodiment of a spring pack 54". It is shown here that the carrier element 76 has a ring surface 78 extending in an axial direction. It can also be seen that, in the present case, the ring element 60 has for example four projections 70 which are arranged in uniformly distributed fashion over the circumference, in the present case with an angular interval of 90°.

The projections 70 illustrated in FIG. 3 have each already been deformed in a radial direction, as illustrated on the left-hand side in FIG. 2.

FIG. 4 illustrates a further embodiment of a spring pack 54'''. Said spring pack has ring elements 60, 62 in the form of sheet-metal parts which each have projections 70 and 70a, specifically likewise four projections 70, 70a, as is the case in the embodiment of FIG. 3.

It can also be seen that the ring elements 60, 62 each have a multiplicity of holes 82 distributed over the circumference, at which holes there are formed axially protruding annular embossments 84. The individual springs 64 can be fixed to the annular embossments 84 in a manner known per se from the prior art.

The spring packs 54 described above can each be handled as one element, and are mounted preferably only by means of one ring element 60 with respect to an associated carrier element, such as a piston within the respective clutch arrangement.

The invention claimed is:

1. A spring pack for a clutch arrangement of a motor vehicle drivetrain, having a first ring element, having a second ring element and having a multiplicity of individual springs which are coupled to the first and the second ring elements such that the first and the second ring elements are movable relative to one another in an axial direction in a manner coupled by the springs, wherein the first and the second ring elements each have an inner circumferential section and an outer circumferential section;
wherein at least one of the first and the second ring element has, in a region of at least one of its inner circumferential section and its outer circumferential section, a multiplicity of radially deformable elements which are designed so as to enable the spring pack to be centered in relation to a ring surface; and
wherein the first and second ring elements are formed as identical parts.

2. The spring pack according to claim 1, wherein at least one of the first and the second ring elements is in the form of a sheet-metal part with a circular inner circumferential section and an outer circumferential section, wherein the deformable elements are in the form of projections which protrude in relation to at least one of the circular inner circumferential section and the outer circumferential section.

3. The spring pack according to claim 2, wherein the projections are oriented at an angle with respect to a radial plane of the sheet-metal part, wherein the angle is greater than 0 degrees and less than 90 degrees.

4. The spring pack according to claim 1, wherein the deformable elements are formed integrally with the ring element.

5. A clutch arrangement for a motor vehicle drivetrain, having a carrier element which has an axially extending ring surface on which a spring pack is mounted, the spring pack having a first ring element, having a second ring element and having a multiplicity of individual springs which are coupled to the first and the second ring elements such that the first and the second ring elements are movable relative to one another in an axial direction in a manner coupled by the springs, wherein the first and the second ring elements each have an inner circumferential section and an outer circumferential section, wherein at least one of the first and the second ring elements has, in a region of at least one of its inner circumferential section and its outer circumferential section, a multiplicity of radially deformable elements which have deformed on the ring surface and center the spring pack in relation to the carrier element, and wherein the first and second ring elements are formed as identical parts.

6. The clutch arrangement according to claim 5, wherein another ring element is mounted in radially movable fashion.

7. A spring pack for a clutch arrangement of a motor vehicle drivetrain, having a first ring element, having a second ring element and having a multiplicity of individual springs which are coupled to the first and the second ring elements such that the first and the second ring elements are movable relative to one another in an axial direction in a manner coupled by the springs, wherein the first and the second ring elements each have an inner circumferential section and an outer circumferential section;
wherein at least one of the first and the second ring elements has, in a region of at least one of its inner circumferential section and its outer circumferential section, a multiplicity of radially deformable elements which are designed so as to enable the spring pack to be mounted captively on a ring surface; and
wherein the first and second ring elements are formed as identical parts.

8. The spring pack according to claim 7, wherein at least one of the first and the second ring elements are in the form of a sheet-metal part with a circular inner circumferential section and an outer circumferential section, wherein the deformable elements are in the form of projections which protrude in relation to at least one of the circular inner circumferential section and the outer circumferential section.

9. The spring pack according to claim 8, wherein the projections are oriented at an angle with respect to a radial plane of the sheet-metal part, wherein the angle is greater than 0 degrees and less than 90 degrees.

10. The spring pack according to claim 7, wherein the deformable elements are formed integrally with the ring element.

11. A clutch arrangement for a motor vehicle drivetrain, having a carrier element which has an axially extending ring surface on which a spring pack is mounted, the spring pack having a first ring element, having a second ring element and having a multiplicity of individual springs which are coupled to the first and the second ring elements such that the first and the second ring elements are movable relative to one another in an axial direction in a manner coupled by the springs, wherein the first and the second ring elements each have an inner circumferential section and an outer circumferential section, wherein the at least one of the first and the second ring elements has, in a region of at least one of its inner circumferential section and its outer circumferential section, a multiplicity of radially deformable elements which have deformed on the ring surface and captively hold the spring pack in relation to the carrier element, and wherein the first and second ring elements are formed as identical parts.

12. The clutch arrangement according to claim 11, wherein another ring element is mounted in radially movable fashion.

13. A method for producing a clutch arrangement, having the steps:
- providing a spring pack having a first ring element, a second ring element, and a multiplicity of individual springs which are coupled to the first and the second ring elements such that the first and the second ring elements are movable relative to one another in an axial direction in a manner coupled by the springs, wherein the first and second ring elements are formed as identical parts; and
- pushing the spring pack axially onto a carrier element of the clutch arrangement, wherein deformable elements of a ring element of the spring pack deform radially on the carrier element in order to at least one of center and captively hold the spring pack in relation to the carrier element.

* * * * *